US009509877B1

(12) United States Patent
Barnes et al.

(10) Patent No.: US 9,509,877 B1
(45) Date of Patent: Nov. 29, 2016

(54) INDICATION OF WHETHER PRINT JOB IS A CUT MEDIA OR CONTINUOUS MEDIA PRINT JOB

(71) Applicant: HEWLETT-PACKARD DEVELOPMENT COMPANY, L.P., Houston, TX (US)

(72) Inventors: Arthur H. Barnes, Vancouver, WA (US); Pierre J. Kaiser, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/749,938

(22) Filed: Jun. 25, 2015

(51) Int. Cl.
G06F 15/00 (2006.01)
H04N 1/00 (2006.01)
G06K 15/02 (2006.01)
G06K 15/00 (2006.01)
G06K 15/16 (2006.01)
G06F 3/12 (2006.01)

(52) U.S. Cl.
CPC ............ H04N 1/0075 (2013.01); G06F 3/125 (2013.01); G06F 3/1254 (2013.01); G06K 15/021 (2013.01); G06K 15/16 (2013.01); G06K 15/4065 (2013.01); H04N 1/00708 (2013.01); H04N 1/00734 (2013.01); H04N 1/00779 (2013.01); H04N 2201/0094 (2013.01)

(58) Field of Classification Search
USPC ....................................... 358/1.15
See application file for complete search history.

(56) References Cited

U.S. PATENT DOCUMENTS

| 4,179,223 A | 12/1979 | Kwan et al. |
| 4,881,840 A | 11/1989 | Rendon et al. |
| 5,255,987 A | 10/1993 | Mizuno et al. |
| 5,925,889 A | 7/1999 | Guillory et al. |
| 5,967,677 A | 10/1999 | McCue et al. |
| 6,153,888 A | 11/2000 | Fournier et al. |
| 6,158,909 A | 12/2000 | McCue et al. |
| 6,323,954 B1 | 11/2001 | Halter |
| 6,350,073 B1 | 2/2002 | McCue et al. |
| 6,361,139 B1 | 3/2002 | Gomez et al. |
| 6,927,857 B2 | 8/2005 | Koele et al. |
| 7,866,903 B2 | 1/2011 | Hatada et al. |
| 8,264,732 B2 | 9/2012 | Anderson et al. |
| 8,706,017 B2 | 4/2014 | Mizes |
| 8,777,368 B2 | 7/2014 | Toya |
| 2004/0136733 A1 | 7/2004 | Kretschmann et al. |
| 2012/0056365 A1* | 3/2012 | Kato ...................... B41J 11/006 271/9.1 |
| 2014/0021334 A1 | 1/2014 | Velner et al. |
| 2014/0307019 A1* | 10/2014 | Muro ...................... B41J 11/663 347/16 |

FOREIGN PATENT DOCUMENTS

DE    102005019080    11/2006

OTHER PUBLICATIONS

Hewlett-Packard "Enhanced Media Sensing with HP Auto Sense," available Dec. 9, 2014 <http://www.hpdealerinfo.com/images/pdfs/HPi_SC_media_HP_AutoSense1.pdf.>.

* cited by examiner

Primary Examiner — Saeid Ebrahimi Dehkord
(74) Attorney, Agent, or Firm — HP Inc Patent Department

(57) ABSTRACT

Examples include an indication of whether a print job is a cut media or continuous media print job. Examples include acquisition of information indicating whether a print job to be printed on a printing device is a cut media print job or a continuous media print job, and determination of when reflected intensity of output light reflected within the printing device has crossed a detection threshold.

14 Claims, 5 Drawing Sheets

INDICATION OF WHETHER PRINT JOB IS A CUT MEDIA OR CONTINUOUS MEDIA PRINT JOB

BACKGROUND

A printing device, such as a printer, multifunction printer (MFP), or the like, may be utilized to print content on a physical medium such as paper. In some examples, the printing device may receive an electronic representation of the content from a computing device, such as a desktop or laptop computer, a mobile device, server, etc. In some examples, the computing device may include a print driver to render the content into a print-ready format that the printing device is able to print and to provide the rendered content to the printing device.

BRIEF DESCRIPTION OF THE DRAWINGS

The following detailed description references the drawings, wherein.

DETAILED DESCRIPTION

A printing device that prints on cut media may determine where to begin printing on a given sheet of cut media as the sheet passes through a printing path of the printing device based on detecting a location of a leading edge of the sheet. A printing device that prints on continuous media may determine where to print on a continuous medium as the medium passes through a printing path of the printing device based on detecting respective locations of registration marks located on the medium. However, it may be difficult or expensive to enable a printing device to detect both cut sheet edges and registration marks such that the printing device is able to print on both cut media and continuous media.

To address these issues, in examples described herein, a printing device may acquire information indicating whether a print job to be printed on the printing device is a cut media print job or a continuous media print job, and may select a first drive level for a media detection light source of the printing device when the information indicates a cut media print job and select a second drive level for the media detection light source when the information indicates a continuous media print job. In some examples described herein, the printing device may cause the media detection light source to output light with an intensity corresponding to the selected drive level, and may determine when reflected intensity of the output light reflected within the printing device has crossed a detection threshold. In some examples described herein, the printing device may, in response to the determination, advance media in the printing device a select amount prior to printing after the determination, the select amount based on whether a cut media print job or a continuous media print job was indicated in the information.

In some examples, the first drive level may cause a sensed amount of light reflected from an opposing mirror when no media is present to be on one side of a threshold and a sensed amount of light reflected from a sheet of cut media to be on the other side of the threshold, such that the printing device may detect a cut sheet edge. In some examples, the second drive level may cause a sensed amount of light reflected from a white portion of a continuous medium to be on one side of the threshold and a sensed amount of light reflected from a registration mark (e.g., black portion) of the continuous medium to be on the other side of the threshold, such that the printing device may detect a continuous medium registration mark. In this manner, examples described herein may utilize a single sensor in different modes to detect both cut media edges for print jobs on cut media and registration marks for print jobs on continuous media. Such examples may maintain costs relatively low by using a single sensor in different modes for the different print job types.

Figure 1:
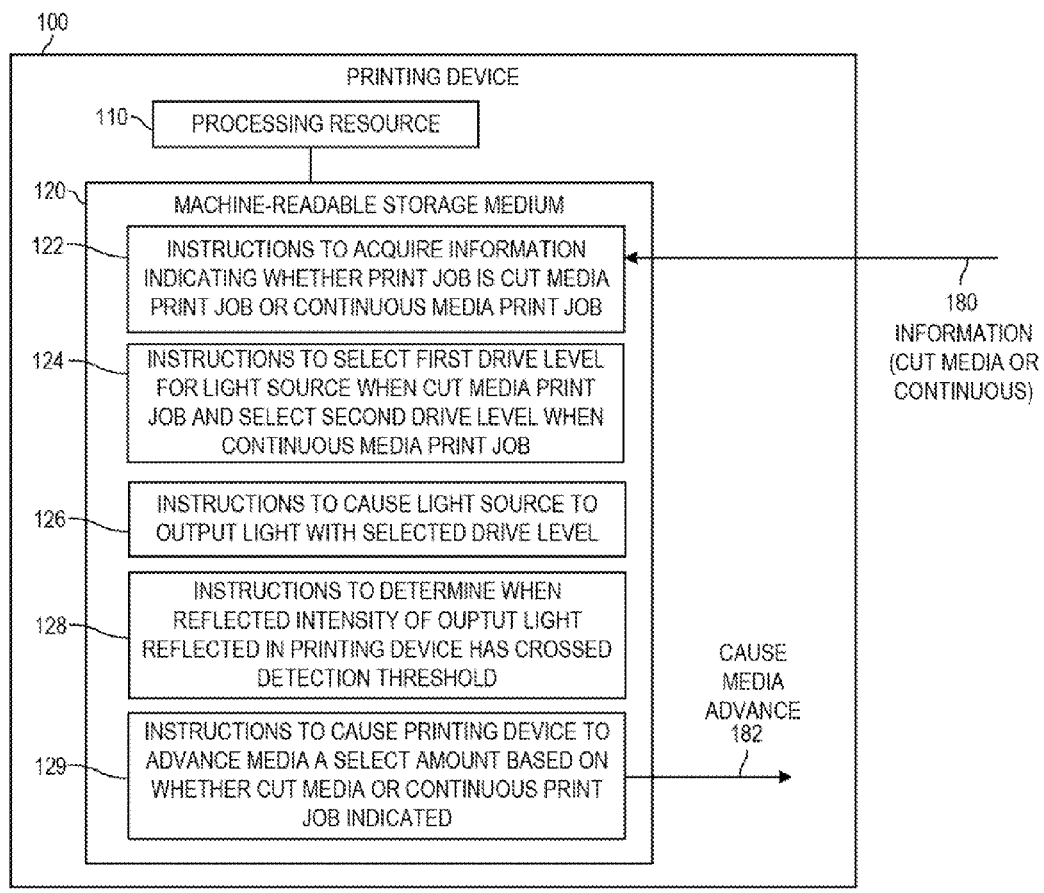
FIG. 1 is a block diagram of an example printing device to select a first or second drive level for a media detection light source based on information indicating a type of print job.

Referring now to the drawings, FIG. 1 is a block diagram of an example printing device 100 to select a first or second drive level for a media detection light source of printing device 100 based on information indicating a type of print job. In examples described herein, a "printing device" may be a device to print content on a physical medium (e.g., paper, etc.) with a printing fluid (e.g., ink) or toner. A printing device may utilize any suitable printing consumable, such as ink, toner, fluids or powders, or other raw materials for printing.

Printing device 100 may be a printing device capable of printing on sheets of cut media, or on continuous media. In examples described herein, "cut media" may be physical media, such as paper, which is separated into discreet sheets, each sheet having a length that is less than approximately double the width of the sheet. In examples described herein, sheets of cut media may be approximately letter size (e.g., approximately 8.5 inches×11 inches), approximately legal size (e.g., approximately 11 inches×17 inches), approximately A4 size, approximately 4 inches×6 inches, or any other suitable standard size.

In examples described herein, "continuous media" may be physical media, such as paper, which has a length that is significantly longer than approximately double the width of media. In examples described herein, continuous media may be provided in a roll, a folded stack, or in any other suitable form such that a printing device may continuously draw or feed the continuous media into the printing device. In some examples, continuous media may include registration marks at regular locations along the length of the media to enable a printing device to determine appropriate locations for printing content on the media. In some examples, continuous media may also include perforations such that pieces of the continuous media may be separated from one another. In such examples, the length of the continuous media is not considered to stop at the perforations. Rather, the perforations may be located at intervals along the full length of the continuous media.

In the example of FIG. 1, printing device 100 may be able to draw, feed through a print path, and print on both cut media and continuous media. Printing device 100 may receive print jobs to be printed on printing device 100, which may include print content in a print-ready (e.g., rendered) format for printing device 100 to print on either cut media or continuous media. In examples described herein, a print job to be printed on cut media may be referred to as a "cut media print job" herein. A cut media print job may be a print job to be printed on one sheet of cut media or to be printed on multiple sheets of cut media. In examples described herein, a print job to be printed on continuous media may be referred to as a "continuous media print job" herein. A content of a continuous media print job may be received by printing device 100 substantially or approximately together, or in pieces received separately over time (e.g., with significant separation in time).

Referring to FIG. 1, printing device 100 includes a processing resource 110 and a machine-readable storage medium 120 comprising (e.g., encoded with) instructions 122, 124, 126, 128, and 129, executable by processing resource 110 to cause printing device 100 perform the functionalities described below in relation to these instructions. In some examples, storage medium 120 may include additional instructions. In other examples, the functionalities described herein in relation to instructions 122, 124, 126, 128, and 129, and any additional instructions described herein in relation to storage medium 120, may be implemented as engines comprising any combination of hardware and instructions (e.g., programming) to implement the functionalities of the engines, as described below.

In the example of FIG. 1, instructions 122 may acquire information 180 indicating whether a print job to be printed on printing device 100 is a cut media print job or a continuous media print job. For example, instructions 122 may acquire information 180 from a print driver operating on a computing device (e.g., a notebook or desktop computer, tablet, server, etc.) separate from printing device 100. In some examples, Information 180 indicating whether a print job to be printed on printing device 100 is a cut media print job or a continuous media print job may be acquired as part of the print job itself (e.g., the print job received from the print driver), or in another communication separate from the print job. In some examples, the print driver may receive user input indicating whether the print job is a cut or continuous media print job, and print driver may provide information 180 indicating the type of print job based on the received user input. In examples described herein, information 180 may indicate the type of print job (i.e., a cut media print job or a continuous media print job) in any suitable manner, form, format, etc., such that printing device 100 (e.g., instructions 122) may determine from information 180 whether the print job is a cut media print job or a continuous media print job. In other examples, instructions 122 may acquire information 180 via user input via input device(s) of printing device 100, such as a front panel touch screen, button(s), or the like, or a combination thereof.

In the example of FIG. 1, printing device 100 may operate in different modes depending on whether the print job is a cut media print job or a continuous media print job. For ease of understanding, examples are described herein in relation to FIG. 1 and FIGS. 2B-2E. For example, in a first mode utilized for cut media print jobs, printing device 100 may drive a media detection light source (e.g., light-emitting diode (LED)) of printing device 100 at a first drive level at which a reflected intensity of light sensed by a media detection light sensor of printing device 100 is on one side of a threshold when no media is present between the light source and an opposing mirror (see, e.g., FIG. 2B). In some examples, the first drive level may further be a drive level at which a reflected intensity of light sensed by the light sensor is on the other side of the threshold when media is present between the light source and the opposing mirror (see, e.g., FIG. 2C). In this manner, printing device 100 may utilize the first mode to detect cut media edges in examples described herein.

Figure 2A:
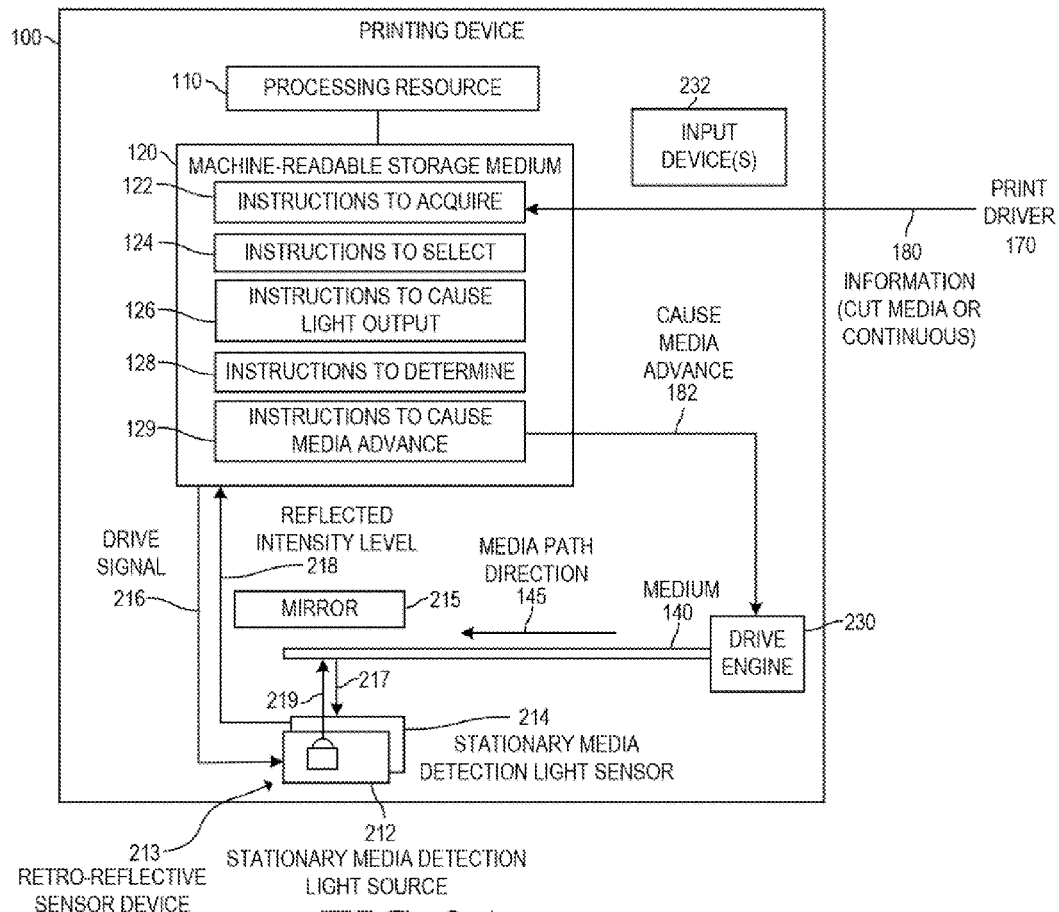
FIG. 2A is a block diagram of an example printing device to advance media in the printing device a select amount based on an indicated type of print job.
Figure 2B:
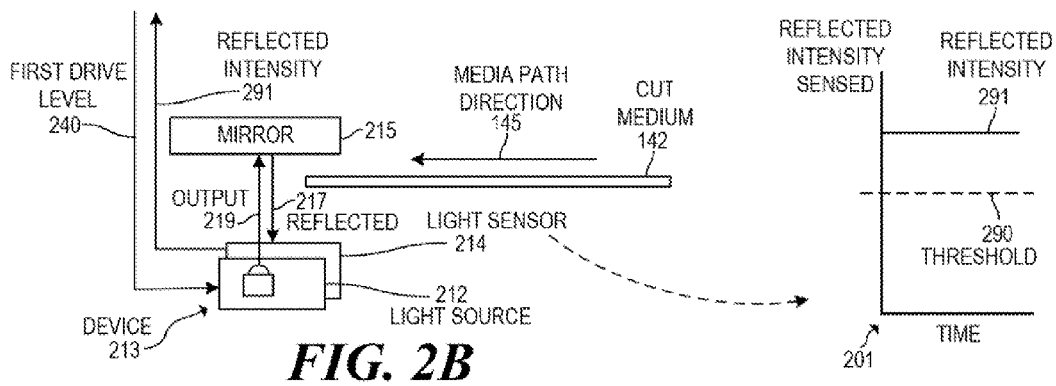
FIG. 2B is a diagram illustrating an example of detection of reflected output light using a light sensor of the printing device of FIG. 2A when no media is present.
Figure 2C:
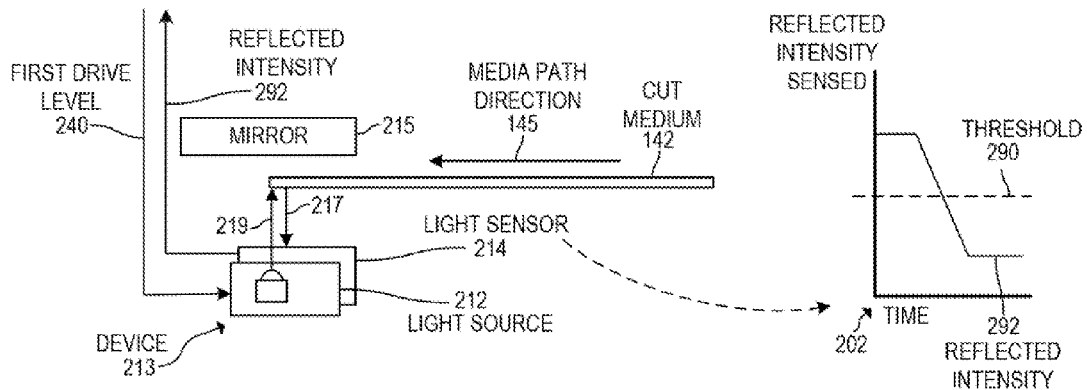
FIG. 2C is a diagram illustrating an example of detection of a cut media edge using a light sensor of the printing device of FIG. 2A.
Figure 2D:
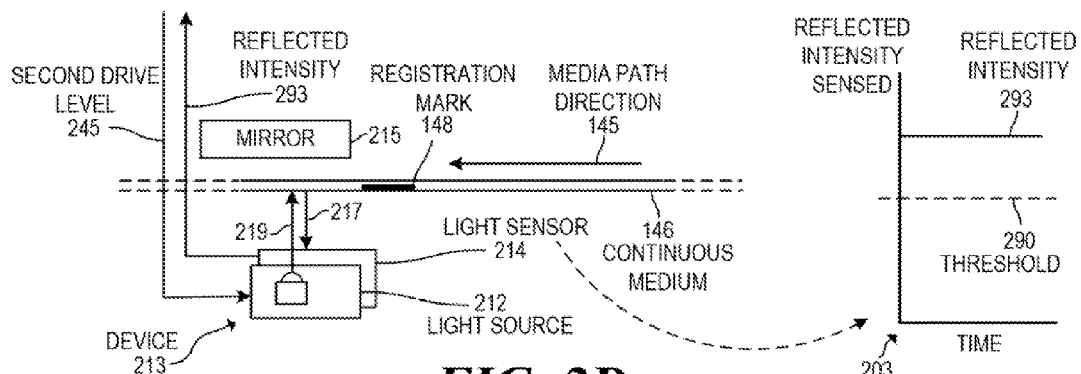
FIG. 2D is a diagram illustrating an example of detection of reflected output light using a light sensor of the printing device of FIG. 2A when a continuous medium is present.
Figure 2E:
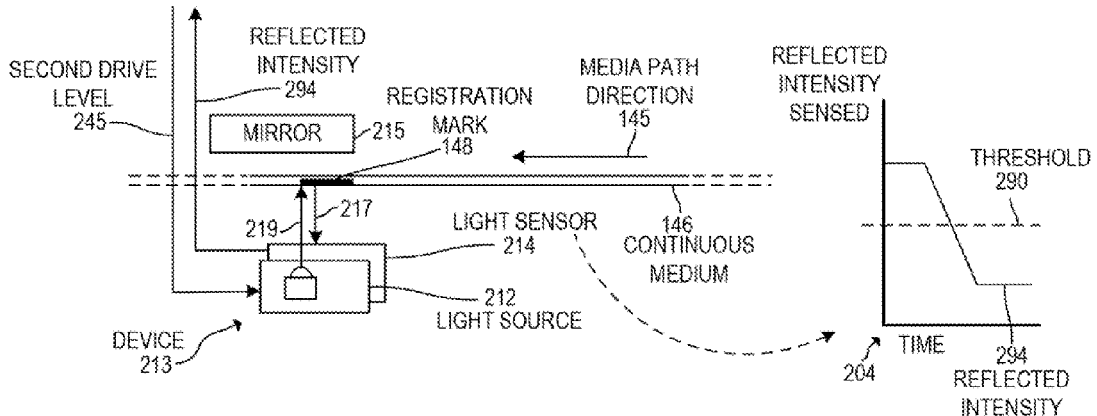
FIG. 2E is a diagram illustrating an example of detection of a continuous medium registration mark using a light sensor of the printing device of FIG. 2A.

In such examples, in a second mode utilized for continuous media print jobs, printing device 100 may drive the media detection light source of printing device 100 at a second drive level at which a reflected intensity of light sensed by the light sensor of printing device 100 is on one side of the threshold when a white portion of media (e.g., no registration mark) is present between the light source and an opposing mirror (see, e.g., FIG. 2D) and at which a reflected intensity of light sensed by the light sensor is on the other side of the threshold when a black portion of media (e.g., a registration mark) is present between the light source and the opposing mirror (see, e.g., FIG. 2E). In this manner, in examples described herein, printing device 100 may utilize the second mode to detect registration marks of continuous media.

Referring again to FIG. 1, as described above, instructions 122 may acquire information 180 indicating whether a print job to be printed on printing device 100 is a cut media print job or a continuous media print job. In such examples, instructions 124 may select a first drive level for a media detection light source of printing device 100 when information 180 indicates a cut media print job and select a second drive level for the media detection light source when information 180 indicates a continuous media print job. In such examples, instructions 126 may cause the media detection light source to output light with an intensity corresponding to the selected drive level.

For example, in response to information 180 indicating a cut media print job, instructions 124 may select the first drive level by reading the first drive level from memory (e.g., a machine-readable storage medium) of printing device 100, then instructions 126 may either drive the media detection light source at the first drive level, or cause another component of printing device 100 to do so (e.g., other electronic circuitry of printing device 100, etc.). In some examples, the first drive level may be a first pulse-width modulation (PWM) duty cycle (or %), or a value indicating the first PWM duty cycle to be used in the first mode for cut media print jobs. In such examples, instructions 126 may drive (or cause another component to drive) the media detection light source with the first PWM duty cycle to cause the media detection light source to output light with an intensity corresponding to the selected drive level (in this example, the first drive level). In examples described herein, the media detection light source (e.g., LED, etc.) may output light with greater intensity when it is driven with a greater drive level (e.g., PWM duty cycle).

In another example, in response to information 180 indicating a continuous media print job, instructions 124 may select the second drive level by reading the second drive level from the memory of printing device 100, then instructions 126 may either drive the media detection light source at the second drive level, or cause another component of printing device 100 to do so (e.g., other electronic circuitry of printing device 100, etc.). In some examples, the second drive level may be a second PWM duty cycle, or a value indicating the second PWM duty cycle to be used in the second mode for continuous media print jobs. In such examples, instructions 126 may drive (or cause another component to drive) the media detection light source with the second PWM duty cycle to cause the media detection light source to output light with an intensity corresponding to the selected drive level (in this example, the second drive level). In some examples, the second drive level (e.g., PWM duty cycle) for continuous media print jobs may be greater than the first drive level (e.g., PWM duty cycle) for cut media print jobs.

In the example of FIG. 1, instructions 128 may determine when reflected intensity of the output light reflected within the printing device has crossed a detection threshold. For example, a media detection light sensor may detect the intensity of the light output by the light source that is reflected off either the mirror opposing the light sensor or media disposed between the mirror and the light sensor. In such examples, the light source may detect the output light reflected by the mirror when there is no media disposed between the mirror and the light sensor (see, e.g., FIG. 2B), and may detect the output light reflected by media when there is media disposed between the mirror and the light sensor (see, e.g., FIGS. 2C-2E). Instructions 128 may directly or indirectly monitor the output of the light sensor to determine when the reflected intensity has crossed a detection threshold. For example, a digital application specific integrated circuit (digital ASIC) may monitor the output of the light sensor, and change its output state when the reflected intensity sensed by the light sensor has crossed the threshold. In such examples, instructions 128 may monitor the output of the digital ASIC for this change of state, and determine that the reflected intensity of the output light reflected within the printing device has crossed the detection threshold when the output of the digital ASIC changes state. In other examples, instructions 128 may determine that the reflected intensity has crossed the threshold directly or indirectly in any other suitable manner.

In the example of FIG. 1, in response to the determination that the reflected intensity has crossed the detection threshold, instructions 129 may cause 182 printing device 100 to advance media in printing device 100 by a select amount, prior to printing after the determination, where the select amount based on whether a cut media print job or a continuous media print job was indicated in information 180. For example, instructions 129 may cause components of printing device 100 able to advance media through a paper path of printing device 100 to advance the media a first amount after the determination when information 180 indicates a cut media print job, and may cause the components to advance the media a second amount after the determination when information 180 indicates a continuous media print job. In such examples, the distance to advance cut media after detection of a cut media edge (before reaching a region for printing on the media) may be different than the distance to advance continuous media after detection of a registration mark (before reaching a region for printing on the media after the mark). In other examples, the amount to advance the media prior to printing may be based on both the type of print job (i.e., cut media or continuous media), and the content of the print job itself (which may not have content at an uppermost printable region, for example).

In examples described herein, instructions, engines, etc., may "acquire" information either actively (e.g., by retrieving the information), passively (e.g., by receiving the information), or in any other suitable manner. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described above. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media is part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution.

In some examples, instructions 122, 124, 126, 128, and 129 may be part of an installation package that, when installed, may be executed by processing resource 110 to implement the functionalities described herein in relation to instructions 121. In such examples, storage medium 120 may be a portable medium, such as a CD, DVD, or flash drive, or a memory maintained by a server from which the installation package can be downloaded and installed. In some examples, functionalities described herein in relation to FIGS. 1 and 2B-2E may be provided in combination with functionalities described herein in relation to any of FIGS. 2A and 3-5.

FIG. 2A is a block diagram of an example printing device 100 to advance media in printing device 100 a select amount based on an Indicated type of print job. In the example of FIG. 2A, additional aspects of printing device 100 are illustrated, in addition to those shown and described for printing device 100 in relation to FIG. 1. For ease of understanding, examples will be described herein in relation to FIG. 2A and FIGS. 2B-2E. FIGS. 2B-2E are diagrams illustrating examples of detection of reflected output light, and corresponding reflected intensity of the output light relative to a threshold 290.

In the example of FIG. 2A, printing device 100 includes processing resource 110 and storage medium 120 (comprising instructions 122, 124, 126, 128, and 129), as described above in relation to FIG. 1. In the example of FIG. 2A, printing device 100 further includes a retro-reflective sensor device 213, including a stationary media detection light source 212 (or "light source" 212) and a stationary media detection light sensor 214 (or "light sensor" 214), and utilizing an opposing mirror 215 of printing device 100. In the example of FIG. 2A, printing device 100 may further include a drive engine 230, which may be any combination of hardware and programming to control movement of media 140 (i.e., cut or continuous media) in and through printing device 100. In the example of FIG. 2A, the components of drive engine 230 may be located as appropriate throughout printing device 100 to control media movement. In the example of FIG. 2A, drive engine 230 may advance a medium 140 in a paper path direction 145 for printing device to print on the medium 140.

In the example of FIG. 2A, retro-reflective sensor device 213 is fixed stationary within printing device 100 such that it is not moveable relative to printing device 100 (e.g., the housing of printing device 100, etc.). In such examples, media detection light source 212 and media detection light sensor 214 of device 213 are each stationary relative to printing device 100 (e.g., not moveable relative to the housing of printing device 100). In the example of FIG. 2A, a drive engine 230 may move media 140 relative to stationary retro-reflective sensor device 213, and thus relative to stationary media detection light source 212 and stationary media detection light sensor 214. In the example of FIG. 2A, drive engine 230 may move media 140 lengthwise in media path direction 145. In such examples, stationary media detection light sensor 214 may detect light reflected from various positions along the length of medium 140 as it moves in the media path direction 145, as medium 140 passes over stationary media detection light sensor 145.

In the example of FIG. 2A, instructions 122 may acquire information 180 indicating whether a print job to be printed on printing device 100 is a cut media print job or a continuous media print job, as described above in relation to FIG. 1. For example, a print driver 170 may operate on a computing device separate from printing device 100, as described above, and may generate print jobs for printing device 100 (e.g., including rendering print content into print-ready format for printing device 100). In some examples, instructions 122 may acquire information 180 (indicating whether the print job to be printed on the printing device is a cut media print job or a continuous media print job) from the print driver 170. In other examples, instructions 122 may acquire information 180 via at least one input device 232 of printing device 100, such as a front panel touch screen, button(s), or the like, or a combination thereof, as described above.

In the example of FIG. 2A, instructions 124 may select a first drive level for media detection light source 212 when information 180 indicates a cut media print job and may select a second drive level for light source 212 when information 180 indicates a continuous media print job. In the example of FIG. 2A, the first and second drive levels may be first and second PWM duty cycles, as described above in relation to FIG. 1, or any other suitable signals or levels.

For example, instructions 124 may select a first drive level for a media detection light source of printing device 100 when information 180 indicates a cut media print job and select a second drive level for the media detection light source when information 180 indicates a continuous media print job. In such examples, instructions 126 may cause the media detection light source 212 to output light 219 with an intensity corresponding to the selected drive level. For example, instructions 126 may drive or cause another component of printing device 100 to drive light source 212 with a drive signal 216 of the selected first or second drive level.

Light sensor 214 may detect the reflected intensity of output light 219 reflected within printing device 100 and output an indication 218 of the level of the reflected intensity sensed by light sensor 214.

As described above in relation to FIG. 1, instructions 128 may determine when reflected intensity of output light 219 reflected 217 within the printing device has crossed a detection threshold. For example, a media detection light sensor 214 may detect the intensity of the light reflected 217 off of either mirror 215 opposing light sensor 214 or off of a medium 140 disposed between mirror 215 and light sensor 214. Instructions 128 may directly or indirectly monitor the output of the light sensor to determine when the reflected intensity has crossed a detection threshold, as described above in relation to FIG. 1.

FIG. 2B illustrates operation of sensor device 213 of printing device 100, including light source 212 and light sensor 214, when driving light source 212 with a signal of a first drive level 240 (e.g., a first PWM duty cycle) for cut media print jobs. FIG. 2B also includes a graph 201 of a detection threshold 290 and reflected intensity sensed by light sensor 214 over time when driving light source 212 with first drive level 240. As illustrated in FIG. 2B, first drive level 240 is a drive level at which light source 212 outputs light 219 at a first intensity at which light sensor 214 is to detect a reflected intensity 291 on a first side of detection threshold 290 (e.g., above threshold 290), when output light 219 is reflected 217 from mirror 215 in printing device 100 (i.e., when no media is between mirror 215 and light sensor 214.

FIG. 2C illustrates further operation of sensor device 213 of printing device 100 when driving light source 212 with a signal of first drive level 240 for cut media print jobs, and includes a graph 202 of detection threshold 290 and reflected intensity sensed by light sensor 214 over time when driving light source 212 with first drive level 240 when media comes between the mirror and light sensor 214. As illustrated in FIG. 2C, first drive level 240 is also a drive level at which light source 212 outputs light 219 at the first intensity at which light sensor 214 is to detect a reflected intensity 292 on a second side of detection threshold 290 (e.g., below threshold 290) when output light 219 is reflected 217 from cut medium 142 between mirror 215 and light sensor 214. In such examples, when driving light source 212 at the first drive level 240, printing device 100 is able to detect a cut media edge based on a determination that the reflected intensity of the light output by light source 212 has crossed detection threshold 290.

FIG. 2D illustrates operation of sensor device 213 of printing device 100, including light source 212 and light sensor 214, when driving light source 212 with a signal of a second drive level 245 (e.g., a second PWM duty cycle) for continuous media print jobs. FIG. 2D also includes a graph 203 of a detection threshold 290 and reflected intensity sensed by light sensor 214 over time when driving light source 212 with second drive level 245. As illustrated in FIG. 2C, second drive level 245 is a drive level at which light source 212 outputs light 219 at a second intensity at which light sensor 214 is to detect a reflected intensity 293 on the first side of detection threshold 290 (i.e., above threshold 290) when output light 219 is reflected 217 from a white (or other relatively high reflectance) portion of continuous medium 146 between light sensor 214 and mirror 215.

FIG. 2E also illustrates operation of sensor device 213 of printing device 100 when driving light source 212 with a signal of second drive level 245 for continuous media print jobs, and includes a graph 204 of a detection threshold 290 and reflected intensity sensed by light sensor 214 over time when driving light source 212 with second drive level 245. As illustrated in FIG. 2E, first drive level 240 is also a drive level at which light source 212 outputs light 219 at the second intensity at which light sensor 214 is to detect a reflected intensity 294 on a second side of detection threshold 290 (i.e., below threshold 290) when the output light is reflected from a black (or other relatively low reflectance) portion of continuous medium 146 between light sensor 214 and mirror 215, such as a registration mark 148. In such examples, when driving light source 212 at the second drive level 245, printing device 100 is able to detect a continuous media registration mark (e.g., mark 148) based on a determination that the reflected intensity of the light output by light source 212 has crossed detection threshold 290.

In the example of FIG. 2A, in response to the determination that the reflected intensity has crossed detection threshold 290, instructions 129 may cause 182 printing device 100 to advance media in printing device 100 by a select amount, prior to printing after the determination, where the select amount based on whether a cut media print job or a continuous media print job was indicated in Information 180, as described above in relation to FIG. 1. In some examples, functionalities described herein in relation to FIGS. 2A-2E may be provided in combination with functionalities described herein in relation to any or FIGS. 1 and 3-5.

Figure 3:
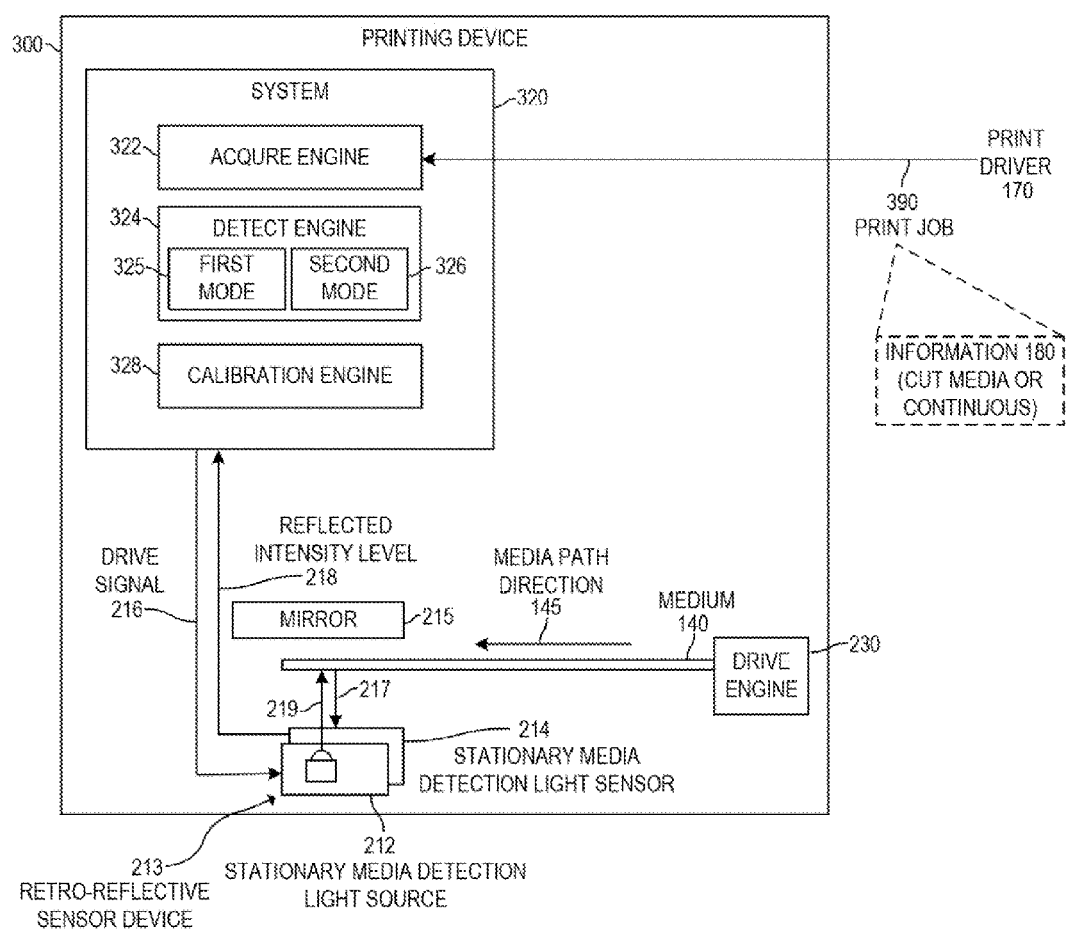
FIG. 3 is a block diagram of an example printing device having a detect engine to operate in a first mode or a second mode in response to information indicating a type of print job.

FIG. 3 is a block diagram of an example printing device 300 having a detect engine 324 to operate in a first mode 325 or a second mode 326 in response to information 180 indicating a type of print job. In the example of FIG. 3, printing device 300 includes a system 320 comprising engines 322, 324, and 328. Printing device 300 further includes a stationary media detection light source 212, and a stationary media detection light sensor 214, a mirror 215 opposing light source 212 and light sensor 214, and a drive engine 230 to move media 140 lengthwise in a media path direction 145, as described above in relation to FIG. 2A.

In the example of FIG. 3, acquire engine 322 may acquire information 180 indicating whether a print job 390 to be printed on printing device 300 is a cut media print job or a continuous media print job, as described above in relation to FIGS. 1 and 2A. In some examples, engine 322 may acquire information 180 from a print driver 170, as described above. In some examples, engine 322 may acquire information 180 from print driver 170 as part of a print job 390 for printing device 300, as described above. In such examples, information 180 may indicate whether print job 390 is a cut media print job or a continuous media print job.

In the example of FIG. 3, detect engine 324 may drive light source 212 with a drive signal 216 to cause light source to output light 219, and light sensor 214 may detect a reflected intensity of light 219 reflected 217 from mirror 215 or a medium 140 and output to detect engine an indication 218 of the level of the reflected intensity sensed by light sensor 214.

In the example of FIG. 3, in response to information 180 indicating a cut media print job, detect engine 324 may operate in a first mode 325 to detect cut media edge(s). In response to information 180 indicating a continuous media print job, engine 324 may operate in a second mode 326 to detect continuous media registration mark(s). In such examples, in the first mode 325, detect engine 324 may drive stationary media detection light source 212 with a drive signal 216 at a first drive level to output light at a first intensity. In the example of FIG. 3, when driving light source 212 at the first drive level, engine 324 may detect a cut media edge in response to a determination that the reflected intensity of output light 219 reflected 217 within printing device 300 has crossed a detection threshold. In some examples, engine 324 may determine that the reflected intensity has crossed the threshold as described above in relation to FIGS. 1-2E.

In the second mode 326, detect engine 324 may drive light source 212 at a second drive level (e.g., higher than the first drive level) to output light 219 at a second intensity (e.g., a greater intensity). In the example of FIG. 3, when driving light source 212 at the second drive level, engine 324 may detect a continuous media registration mark in response to a determination that reflected intensity of output light 219 reflected 217 within printing device 300 has crossed the detection threshold. In some examples, engine 324 may determine that the reflected intensity has crossed the threshold as described above in relation to FIGS. 1-2E. In some examples, the first drive level may be a first pulse PWM duty cycle, and the second drive level is a second PWM duty cycle that is higher than the first PWM duty cycle. In some examples, light source 214 may include a light-emitting diode (LED) to output light 219.

In some examples, when operating in the first mode 325, detect engine 324 may use light source 212 and light sensor 214 printing device 300 as a retro-reflective sensor, using a reflected intensity of light from a highly reflective surface (e.g., mirror 215) as a baseline, and detecting a cut media edge in response to a determination that the reflected intensity has dropped sufficiently (e.g., below a threshold) due to a less reflective surface (e.g., a medium such as paper) coming between sensor 214 and the reflective surface (e.g., as shown in FIGS. 2B and 2C) and blocking an optical path including a highly reflective surface (e.g., mirror 215).

In some examples, when operating in the second mode 326, detect engine 324 may use light source 212 and light sensor 214 as a reflective sensor, comparing reflected intensities coming off of objects (e.g., media such as paper) rather than monitoring for an object to block an optical path including a highly reflective surface. For example, in the second mode 326, detect engine 324 may use a reflected intensity from a white portion of a medium (e.g., containing no registration mark) as a baseline, and detect a continuous media registration mark in response to a determination that the reflected intensity has dropped sufficiently (e.g., below a threshold) due to the light being reflected from a black portion of the medium (e.g., a registration mark), as shown, for example, in FIGS. 2D and 2E).

In some examples, light source 212 and light sensor 214 may form portions of a retro-reflective sensor device of printing device 300. In such examples, the stationary retro-reflective sensor device 213 may include stationary media detection light source 212 and stationary media detection light sensor 214 to detect the reflected intensity of light output 219 by the light source and reflected 217 within printing device 300. In such examples, detect engine 324 may detect cut media edges and continuous media registration marks based on the detections of stationary media detection light sensor 214, as described above. As described above, light sensor 214 may detect the reflected intensity of light output 219 by light source 212 and reflected 217 off of an opposing mirror 215 when no media is between light sensor 212 and mirror 215 (see, e.g., FIG. 2B).

In the example of FIG. 3, calibration engine 328 may draw a medium 140 into a paper path such that a white portion of the medium is between light source 214 and mirror 215, as shown in FIG. 3. In such examples, engine 328 may drive light source 212 to output light 219 and then adjust the drive level of the drive signal 216 applied to light source 212 until reflected intensity of output light 219 reflected 217 from the white portion of medium 140 reaches a predetermined first mode calibration level, and set the drive level applied when the reflected intensity reached the predetermined first mode calibration level as the first drive level for the first mode. In some examples, the predetermined first mode calibration level may be a level below the detection threshold described above, such that in the first mode the reflected intensity, when driving with the first drive level, will drop below the threshold when cut media blocks the light from being reflected from the mirror 215.

In the example of FIG. 3, calibration engine 328 is further to adjust the drive level of the drive signal 216 applied to light source 212 until reflected intensity of output light 219 reflected 217 from the white portion of the medium reaches a predetermined second mode calibration level, wherein the predetermined first mode calibration level and the predetermined second mode calibration level are on opposite sides of the detection threshold. In such examples, engine 328 may set the drive level applied when the reflected intensity reached the predetermined second mode calibration level as the second drive level for the second mode. In such examples, the predetermined second mode calibration level may be a level above the detection threshold described above, such that in the second mode the reflected intensity, when driving with the second drive level, will drop below the threshold when light is reflected from a registration mark.

Although in examples described herein, a greater reflected intensity may be represented as "above" a threshold while a lesser reflected intensity may be represented as "below" the threshold, this is only an example. In other examples this relationship may be inverted such that, a greater reflected intensity may be "below" a threshold while a lesser reflected intensity may be "above" the threshold. In examples described herein, while using the first drive level for cut media print jobs, the reflected intensities from the mirror and from media are on opposite sides of the threshold (regardless of which is above and which is below the threshold), and while using the second drive level for continuous media print jobs, the reflected intensities from white portions of media and from registration marks of the media are on opposite sides of the threshold (regardless of which is above and which is below the threshold).

In the example of FIG. 3, system 320 may be implemented by at least one computing device and may include at least engines 322, 324, and 328, which may be any combination of hardware and machine-readable instructions (e.g., programming) to implement the functionalities of the engines described herein. In examples described herein, such combinations of hardware and instructions may be implemented in a number of different ways. For example, the instructions for the engines may be processor executable instructions stored on at least one non-transitory machine-readable storage medium and the hardware for the engines may include at least one processing resource to execute those instructions. In such examples, the at least one machine-readable storage medium may store instructions that, when executed by the at least one processing resource, implement (in whole or in part) the engines of system 320. In such examples, system 320 may include the at least one machine-readable storage medium storing the instructions and the at least one processing resource to execute the instructions, or one or more of the at least one machine-readable storage medium may be separate from but accessible to system 320 and the at least one processing resource (e.g., via a computer network).

In some examples, the instructions can be part of an installation package that, when installed, can be executed by the at least one processing resource to implement at least the engines of system 320. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 320 including the processing resource. In such examples, the machine-readable storage medium may include memory such as a hard drive, solid state drive, or the like. In other examples, the functionalities of any engines of system 320 may be implemented at least partially in the form of electronic circuitry. In some examples, functionalities described herein in relation to FIG. 3 may be provided in combination with functionalities described herein in relation to any of FIGS. 1-2D and 4-5.

Figures 4, 5:
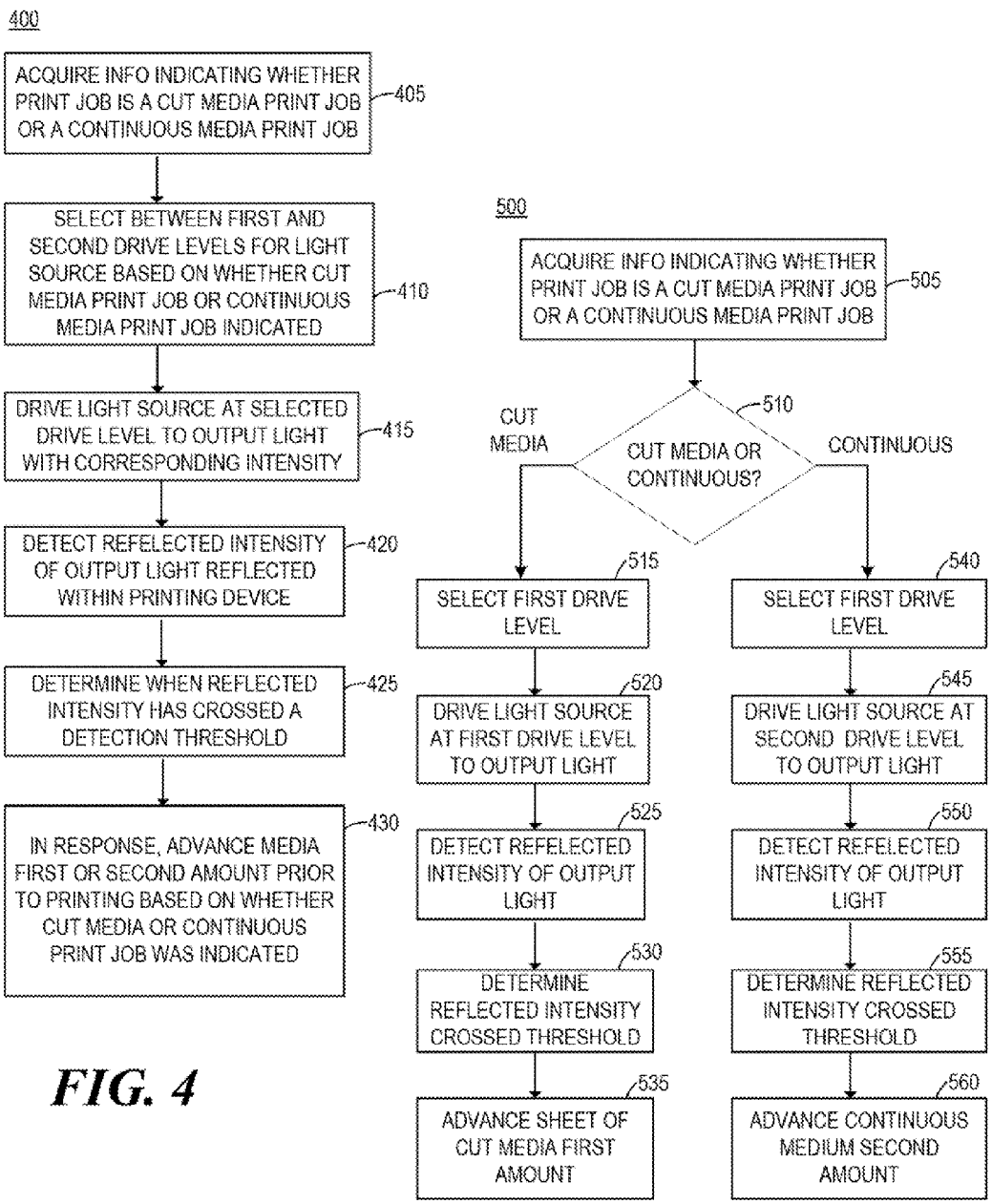
FIG. 4 is a flowchart of an example method for determining when the reflected intensity of the reflected light has crossed a detection threshold.
FIG. 5 is a flowchart of an example method for selecting between a first drive level and a second drive level for a media detection light source of a printing device.

FIG. 4 is a flowchart of an example method 400 for determining when reflected intensity of reflected light has crossed a detection threshold. Although execution of method 400 is described below with reference to printing device 300 of FIG. 3, other suitable computing devices for the execution of method 400 can be utilized (e.g., printing device 100 of FIG. 1 or FIG. 2A). Additionally, implementation of method 400 is not limited to such examples.

At 405 of method 400, engine 322 of printing device 300 may acquire information 180 indicating whether a print job 390 to be printed on printing device 300 is a cut media print job or a continuous media print job. At 410, detect engine 324 may select between a first drive level and a second drive level for a media detection light source 212 of printing device 300 based on whether the acquired information 180 indicates a cut media print job or a continuous media print job, as described above.

At 415, engine 324 may drive light source 212 at the selected drive level to output light with an intensity corresponding to the selected drive level. At 420, engine 324 may detect, with a stationary media detection light sensor 214 of printing device 300, reflected intensity of output light 219 reflected 217 within printing device 300, as described above. At 425, engine 324 may determine when the reflected intensity of the reflected light 217 has crossed a detection threshold, as described above. At 430, in response to the determination that the reflected intensity has crossed the threshold, detect engine may (using drive engine 230) advance media 140 in printing device 300 either a first or a second amount, prior to printing after the determination, based on whether a cut media print job or a continuous media print job was indicated in the information, as described above in relation to FIG. 1.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

FIG. 5 is a flowchart of an example method 500 for selecting between a first drive level and a second drive level for a media detection light source 212 of printing device 300. Although execution of method 500 is described below with reference to printing device 300 of FIG. 3, other suitable computing devices for the execution of method 500 can be utilized (e.g., printing device 100 of FIG. 1 or FIG. 2A). Additionally, implementation of method 500 is not limited to such examples.

At 505 of method 500, engine 322 of printing device 300 may acquire information 180 indicating whether a print job 390 to be printed on printing device 300 is a cut media print job or a continuous media print job. At 510, detect engine 324 may determine whether the acquired information 180 indicates a cut media print job or a continuous media print job, as described above.

In response to a determination at 510 that information 180 indicates a cut media print job, engine 324 may select the first drive level at 515 and, in response, drive media detection light source 212 at the first drive level at 520. At 525, engine 324 may detect, with a stationary media detection light sensor 214 of printing device 300, reflected intensity of output light 219 reflected 217 within printing device 300, as described above. At 530, engine 324 may determine when the reflected intensity of the reflected light 217 has crossed a detection threshold, as described above. In response to the determination at 530 that the reflected intensity has crossed the threshold and based on information 180 indicating a cut media print job, at 535, engine 324 may advance a sheet of cut media 140 in printing device 300 a first amount (for cut media print jobs), different than a second amount of advance for continuous media print jobs.

In response to a determination at 510 that information 180 indicates a continuous media print job, engine 324 may select the second drive level at 540 and, in response, drive media detection light source 212 at the second drive level at 545. At 550, engine 324 may detect, with a stationary media detection light sensor 214 of printing device 300, reflected intensity of output light 219 reflected 217 within printing device 300, as described above. At 555, engine 324 may determine when the reflected intensity of the reflected light 217 has crossed a detection threshold, as described above. In response to the determination at 555 that the reflected intensity has crossed the threshold and based on information 180 indicating a continuous media print job, at 560, engine 324 may advance a continuous medium 140 in printing device 300 the second amount (for continuous media print jobs), different than the first amount, as described above.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

All of the features disclosed in this specification (including any accompanying claims, abstract and drawings), and/or all of the elements of any method or process so disclosed, may be combined in any combination, except combinations where at least some of such features and/or elements are mutually exclusive. Further, in the drawings, like reference numerals indicate like elements throughout.

What is claimed is:

1. An article comprising at least one non-transitory machine-readable storage medium comprising instructions executable by a processing resource of a printing device to:
acquire information indicating whether a print job to be printed on the printing device is a cut media print job or a continuous media print job;
select a first drive level for a media detection light source of the printing device when the information indicates a cut media print job and select a second drive level for the media detection light source when the information indicates a continuous media print job, wherein the first drive level is a drive level at which the media detection light source outputs light at a first intensity at which a stationary media detection light sensor of the printing device is to detect a reflected intensity on a first side of the detection threshold when the output light is reflected from a mirror in the printing device, and is to detect a reflected intensity on a second side of the detection threshold when the output light is reflected from media between the light sensor and an opposing mirror;
cause the media detection light source to output light with an intensity corresponding to the selected drive level;
determine when reflected intensity of the output light reflected within the printing device has crossed a detection threshold; and
in response to the determination, cause the printing device to advance media in the printing device by a select amount, prior to printing after the determination, the select amount based on whether a cut media print job or a continuous media print job was indicated in the information.

2. The article of claim 1, wherein the instructions to acquire comprise:
instructions to acquire, from a print driver to generate the print job for the printing device, the information indicating whether the print job to be printed on the printing device is a cut media print job or a continuous media print job.

3. The article of claim 1, wherein the instructions to determine comprise instructions to:
determine when the reflected intensity of the output light reflected within the printing device crosses a detection threshold, based on detection of the reflected intensity by a stationary media detection light sensor of the printing device to detect light reflected from various positions along a length of a medium moving in a media path direction as the medium passes over the stationary media detection light sensor.

4. The article of claim 1, wherein the second drive level is a drive level at which the media detection light source outputs light at a second intensity at which the light sensor is to detect a reflected intensity on the first side of the detection threshold when the output light is reflected from a white portion of media between the light sensor and the mirror, and is to detect a reflected intensity on a second side of the detection threshold when the output light is reflected from a black portion of the media between the light sensor and the mirror.

5. The article of claim 1, wherein the instructions to acquire comprise:
instructions to acquire, via at least one input device of the printing device, the information indicating whether the print job to be printed on the printing device is a cut media print job or a continuous media print job.

6. A printing device comprising:
an acquire engine to acquire information indicating whether a print job to be printed on the printing device is a cut media print job or a continuous media print job; and
a detect engine to operate in a first mode to detect a cut media edge in response to the information indicating a cut media print job and to operate in a second mode to detect a continuous media registration mark in response to the information indicating a continuous media print job;

wherein, in the first mode, the detect engine is to:
drive a stationary media detection light source at a first drive level to output light at a first intensity, wherein the first drive level is a first pulse width modulation (PWM) duty cycle; and
when driving at the first drive level, detect a cut media edge in response to a determination that reflected intensity of the output light reflected within the printing device has crossed a detection threshold; and wherein, in the second mode, the detect engine is to:
drive the light source at a second drive level to output light at a second intensity the first drive level is a first pulse width modulation (PWM) duty cycle, wherein the second drive level is a second PWM duty cycle that is higher than the first PWM duty cycle; and
when driving at the second drive level, detect a continuous media registration mark in response to a determination that reflected intensity of the output light reflected within the printing device has crossed the detection threshold.

7. The printing device of claim 6, further comprising:
a stationary retro-reflective sensor device comprising:
the light source; and
a stationary media detection light sensor to detect the reflected intensity of light output by the light source and reflected within the printing device;
wherein the detect engine is to detect cut media edges and continuous media registration marks based on the detections of the stationary media detection light sensor;
wherein the stationary media detection light sensor is to detect the reflected intensity of light output by the light source and reflected off of an opposing mirror when no media is between the stationary media detection light sensor and the mirror; and
wherein the acquire engine is to acquire the information as part of the print job received from a print driver for the printing device.

8. The printing device of claim 6, wherein:
when operating in the first mode, the detect engine is to use the light source and a stationary media detection light sensor of the printing device as a retro-reflective sensor; and
when operating in the second mode, the detect engine is to use the light source and the light sensor as a reflective sensor.

9. The printing device of claim 6, wherein:
the stationary media detection light source includes a light-emitting diode (LED) to output light.

10. The printing device of claim 6, further comprising:
a calibration engine to:
draw a medium into a paper path such that a white portion of the medium between the stationary media detection light source and a mirror of the printing device; and
drive the light source to output light and adjust the drive level applied to the light source until reflected intensity of output light reflected from a white portion of the medium reaches a predetermined first mode calibration level; and
set the drive level applied when the reflected intensity reached the predetermined first mode calibration level as the first drive level for the first mode.

11. The printing device of claim 10, wherein the calibration engine is further to:
adjust the drive level applied to the light source until reflected intensity of output light reflected from the white portion of the medium reaches a predetermined second mode calibration level, wherein the predetermined first mode calibration level and the predetermined second mode calibration level are on opposite sides of the detection threshold; and
set the drive level applied when the reflected intensity reached the predetermined second mode calibration level as the second drive level for the second mode.

12. A method comprising:
acquiring, with a printing device, information indicating whether a print job to be printed on the printing device is a cut media print job or a continuous media print job;
selecting between a first drive level and a second drive level for a media detection light source of the printing device based on whether the acquired information indicates a cut media print job or a continuous media print job, wherein the first drive level is a first pulse width modulation (PWM) duty cycle and wherein the second drive level is a second PWM duty cycle that is higher than the first PWM duty cycle;
driving the media detection light source at the selected drive level to output light with an intensity corresponding to the selected drive level;
detecting, with a stationary media detection light sensor of the printing device, reflected intensity of the output light reflected within the printing device;
determining when the reflected intensity of the reflected light has crossed a detection threshold; and
in response to the determination, advancing media in the printing device either a first or a second amount prior to printing after the determination, based on whether a cut media print job or a continuous media print job was indicated in the information.

13. The method of claim 12, wherein:
the selecting comprises selecting the first drive level when the acquired information indicates a cut media print job;
the driving comprises driving the media detection light source at the first drive level in response to selecting the first drive level; and
the advancing comprises advancing a sheet of cut media in the printing device the first amount, different than the second amount, in response to the determination and based on the information indicating a cut media print job.

14. The method of claim 12, wherein:
the selecting comprises selecting the second drive level when the acquired information indicates a continuous media print job, the second drive level being higher than the first drive level;
the driving comprises driving the media detection light source at the second drive level in response to selecting the second drive level; and
the advancing comprises advancing a continuous medium in the printing device the second amount, different than the first amount, in response to the determination and based on the information indicating a continuous media print job.

* * * * *

UNITED STATES PATENT AND TRADEMARK OFFICE
CERTIFICATE OF CORRECTION

PATENT NO. : 9,509,877 B1 Page 1 of 1
APPLICATION NO. : 14/749938
DATED : November 29, 2016
INVENTOR(S) : Arthur H. Barnes et al.

It is certified that error appears in the above-identified patent and that said Letters Patent is hereby corrected as shown below:

In the Drawings

In sheet 4 of 5, reference numeral 322, Line 1, delete "ACQURE" and insert -- ACQUIRE --, therefor.

Signed and Sealed this
Eighteenth Day of April, 2017

Michelle K. Lee
*Director of the United States Patent and Trademark Office*